United States Patent [19]

Reisinger

[11] 3,851,099

[45] Nov. 26, 1974

[54] TIME-DIVISION MULTIPLEX SYSTEM

[75] Inventor: Konrad Reisinger, Zorneding, Germany

[73] Assignee: Siemens Aktiengesellschaft, Berlin and Munich, Germany

[22] Filed: Aug. 1, 1973

[21] Appl. No.: 384,414

[30] Foreign Application Priority Data

Aug. 30, 1972 Germany .......................... 2242639

[52] U.S. Cl. .................................... 178/50, 178/79

[51] Int. Cl. ............................................... H04j 3/04

[58] Field of Search ............ 178/50, 79; 179/15 BA; 340/346, 354, 364

[56] References Cited

UNITED STATES PATENTS

| | | | |
|---|---|---|---|
| 3,387,086 | 6/1968 | Beresin | 179/15 BA |
| 3,466,397 | 9/1969 | Benowitz | 179/15 BA |

*Primary Examiner*—David L. Stewart

[57] ABSTRACT

A circuit arrangement for the transmission of a plurality of binary coded messages and continuous signals over a common channel according to time division multiplex principles is described. A fixed character frame is used, and the characters and continuous signals are rested character by character. Prior to transmission, start and stop signals are separated from the message signal, and they are reinserted at the receiver. Message signals and continuous signals are routed to a first shift register. A start signal identifying circuit operates in response to the presence of a start signal in the first shift register to reset a code counter which records the signal elements of a message signal and restores a phase correcting circuit to its original position. The output signal from the first shift register is applied to a second shift register which has a number of stages corresponding to the number of signal elements in a message signal. The outputs of shift register stages containing information bits are connected in parallel to inputs of stages of a third shift register. The latter shift register contains a further stage for receiving the output of an evaluating circuit which interprets the states of the first and last stages of the second shift register so as to distinguish message signals from continuous signals. The parallel transmission of information signals from the second to the third shift register occurs if the first stage of the second shift register contains a start signal, the code counter has reached its final registration position and the third shift register is not currently being read out. When the multiplexer samples the channel in question, the contents of the third shift register are read out for transmission.

6 Claims, 3 Drawing Figures

TIME-DIVISION MULTIPLEX SYSTEM

BACKGROUND OF THE INVENTION

This invention relates to a circuit arrangement for transmitting a multiplicity of binary-coded telegraph messages and continuous signals over a common transmission channel according to the time-division multiplex principle. More particularly, however, this invention uses a fixed character frame and nesting of the individual telegraph characters and continuous signals in the transmitted multiplex signal, wherein at the sending end start and stop signal elements of the telegraph signal are separated and added at the receiving end to the information signal.

The basic principle of time-division multiplex, multichannel communication resides in the fact that a multiplicity of channels are provided for a single communications path, whereby a number of time intervals, which may equal the number of channels, each form a sampling interval. Each of these time intervals is allocated to a specified channel and each channel is connected with the communication path only during the associated time interval. During the portions of the sampling interval allotted to the other channels there is no connection between the channel under consideration and the path. A separation of the channels is provided at the sending end prior to the sampling and at the receiving end after the received signals are allocated to the proper end apparatus. The sampling at the transmitter occurs in a manner such that the data signals are sampled at regularly repeated instants of time.

FIG. 1 shows the fundamental construction of a time-division multiplex system. At the transmitter is a central multiplexer M to which are routed the individual telegraph messages E1, E2 and E3 over transmitter circuits KS1, KS2 and KS3. The individual transmitter circuits bring the transmitted telegraph signals to a uniform time slot pattern so that they can be coupled to a multiplexer. The multiplexer is shown as a rotating switch Z1 which, dependent on the number of the transferred telegraph channels, rotates at such a speed that in the course of a pulse duration each channel is sampled once. The multiplexer is actually, as is known usually constructed from electronic circuitry and is made up of electronic stages has its own clock generator and, in addition, is equipped to place synchronizing pulses into the multiplex signal transmitted over the transmission line U.

In the central receiver station is a demultiplexer D whose rotating switch Z2 rotates at the same speed as the switch Z1 in the multiplexer. The transmitted synchronizing pulses are utilized to cause the two switches to run synchronously so that the allocation of the transmitted telegraph characters to the correct receiver channels KE1, KE2 and K3 is assured. The telegraph characters transmitted to the telegraph channels are generated at the outlets A1, A2, A3 of the receiving units.

An object of the invention is to provide a receiving circuit which will permit the transmission of telegraph characters according to the time-division multiplex principle which enables the transmission of telegraph characters with single or 1.5 times stop signal and continuous positions.

SUMMARY OF THE INVENTION

The foregoing and other objects are obtained by the invention in that the telegraph signals and continuous signals are routed to a two-bit shift register to which is allocated a start-signal-identifying circuit. Upon the appearance of a start signal, the identifying circuit resets a code counter counting the signal elements of a telegraph signal and restores a phase corrector to its original position. The output signal of the two-bit shift register, with the clock pulses delivered by the phase corrector in the center of the telegraph signals, is applied to a second shift register whose number of stages corresponds to the number of signal elements of a telegraph signal. The outputs of the shift register stages containing information bits are connected to the inputs of the stages of a third shift register, which in turn is connected in series with a further register stage into which a given binary state is input from an evaluating circuit interpreting the state of the first and the last stage of the second shift register so as to distinguish telegraph signals and continuous signals. The parallel acceptance of the information signals from the second shift register into the third shift register takes place if a state corresponding to the start signal of a telegraph signal is registered in the first stage of the second shift register, the code counter has reached the final position and the third shift register is currently not being read out. Upon the sampling of the allocated channel in the multiplexer, the third shift register is read out in series with a high clock frequency.

The circuit arrangement according to the invention enables the transmission of telegraph signals with a single stop signal and a 1.5 times stop signal and continuous signals. Start and stop signals of a telegraph signal are separated at the sending end, and only the information signals are transmitted. At the receiving end, start and stop signals are formed anew and added to the information signals. To distinguish between telegraph signals and continuous signals, a further bit is added for transmission prior to the information bits determining whether the subsequent information bits stem from a telegraph signal or from a continuous signal. The telegraph signals are nested, by character, into the multiplex signal. Since the start and stop signals of the telegraph signals are not transmitted, a larger quantity of data is transferred in the case of characterwise nesting than in the case of step-by-step nesting. At the same time, the characterwise nesting of the channel information in the multiplex signal allows the connection of a comparatively large number of channels to the multiplexer. The sampling cycle of the multiplexer runs faster than the connected telegraph message source. Thus, for the sampling cycle a value of 140 ms is obtained in the case of 50-baud telegraph signals according to CCITT Code No. 2, whose duration can amount to 150 ms in the case of a 1.5 times stop signal and without distortion. The result is a simple circuit which is economical and which can completely be constructed using integrated circuit technology.

BRIEF DESCRIPTION OF THE DRAWINGS

The principles of the invention will be more readily understood by reference to the description of a preferred embodiment given hereinbelow in conjunction with the drawings wherein.

DETAILED DESCRIPTION OF THE DRAWINGS

Figure 2:
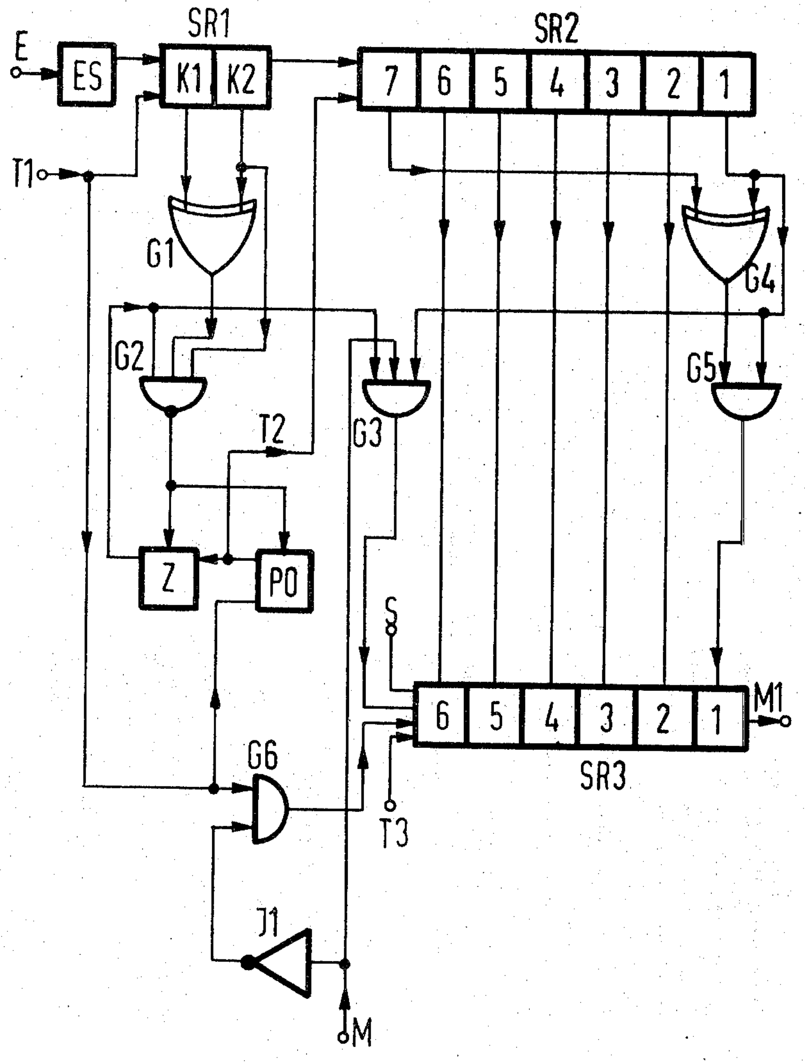

In FIG. 2 the data signal arrives at the input E and is coupled to input circuit ES containing a low-pass filter for the suppresssion of interfering signals and a circuit for adapting the data signals to the subsequent logic stages. The output of ES is connected to a two-bit shift register SR1 which is comprised of the two stages K1 and K2. A clock is applied to operate the shift register; the clock pulse has a high frequency in comparison with the frequency of the transmitted telegraph signals.

To the outputs of the stages 1 and 2, which may be constructed as flip-flop circuits, there is connected an exclusive OR gate G1 which generates a pulse at its output with little sampling distortion each time the polarity is reversed. However, since the transmitter circuit should respond only to the positive edge of a start signal, the output of the gate G1 is connected with a NAND gate G2. To this end, the output of the stage K2 of the shift register SR1 is coupled to an input of gate G2 in addition to the output of the gate G1. The third input of the gate G2 is received from the output of a code counter Z, which may be a conventional binary counter and which has reached its final position, and in this condition the counter transmits an output signal which opens the gate G2.

A phase corrector PO, which is conveniently constructed as a digital frequency divider, builds from the relatively high frequency clock pulse sequence T1 a clock pulse sequence T2 at time intervals of the pulse duration of the telegraph signals. In the process, each of the individual pulses appears in the middle of the signals to be transmitted. The data applied to the output of the shift register SR1 are written in series into a second shift register SR2 with the clock pulses T2 transmitted from the phase corrector which occur, e.g., at 20-ms intervals. The shift register is equipped with seven registers in this example in that telegraph signals are transmitted.

As soon as the telegraph signal is shifted into the shift register SR2, the stage 1 stores the start-signal polarity, and the stage 7 stores the stop-signal polarity. The outputs of the stages 2, 3, 4, 5 and 6 which contain the information signals are connected directly to the inputs of the register stages 2 to 6 of a third shift register SR3. The parallel acceptance of the information bits from the shift register SR2 into the shift register SR3 occurs with the clock pulse T3 which occurs together with the enabling pulse delivered at the output of the gate G3. The clock pulse T3 can thus be derived with a delay element from the edge of the output pulse at the gate G3. The gate G3 establishes the period wherein the acceptance takes place. An input to gate G3 is connected to the stage 1 of the shift register SR2. The other two inputs are controlled from the output of the code counter and by the multiplexer M.

The code counter Z transmits, upon reaching the final position, that is, the middle of the single stop signal of the telegraph signal, for example, after 130 ms, an enabling signal to the gate G3. During the acceptance of the content of the shift register SR3 the multiplexer transmits a stop signal to the gate G3, and this signal is converted into an enabling signal during the sampling of the other time-division multiplex channels. If the coincidence condition of the gate G3 is satisfied, a pulse appears at the output and in conjunction with the clock pulse T3 the content of the stages 2 to 6 of the shift register SR2 is concurrently accepted into the stages 2 to 6 of the shift register SR3. The presence of start and stop signals is monitored by means of the exclusive-OR gate G4 and the AND gate G5. If the two signals are present, the presence of a telegraph signal is indicated, and the binary state provided therefor, e.g., 1 (corresponds to the start signal polarity) is read into the stage 1 of the shift register SR3.

If a continuous state is present, no output signal is generated at the output of the gate G5 and the stage 1 of the shift register SR3 assumes its rest position, in which the other binary state 0 (corresponds to the stop-signal polarity) is stored. The gate G3 is disabled at the sampling instant of the channel by the multiplexer. The stop signal is likewise applied to an inverter J1 from whose output an enabling signal is produced. The latter enabling signal opens the gate G6, so that the clock pulse sequence T1 is switched with a high frequency and is applied as a shifting clock pulse to the shift register SR3. The content of the shift register is now read out quickly and nested into the multiplex signal to be emitted over the channel input of the multiplexer M1. During the readout of the shift register SR3 the binary state ( 0 ), of a polarity opposite to the start-signal polarity, is read in from the stage 6 over the input S, so that after the readout and prior to the acceptance of the next signal, the register stages have one of the two continuous states ( 0 ).

Upon the appearance of the foregoing continuous state in the data signal to be tansmitted, the start-signal identifying circuit does not respond, so that no acceptance takes place from the shift register SR2 to the shift register SR3, and with the next read-in process the stored states are nested into the multiplex signal. When the succeeding telegraph channel is sampled by the multiplexer, the gate G3 again receives an enabling signal which acts with the inverter J1 to produce a disabling signal for the gate G6, and it inhibits the connection of the clock pulse T1 to the shift register SR3. A requisite condition for the emission of a telegraph signal is the fact that a start signal has been identified and the code counter Z has reached its final position, because only then does the gate G3 receive the enabling signal needed for the switching. Upon the appearance of a start-stop edge, there is generated at the output of the gate G2 a pulse which resets the code counter Z and the phase corrector PO to the initial position. This means, in the case of the code counter, that a counting process is started which is controlled with the clock pulses T2 transmitted from the phase corrector, and is terminated in the center of the single stop signal of the telegraph signal. During the counting process the code counter delivers at the output a disabling signal which becomes an enabling signal when the final positon is reached. The resetting of the phase corrector PO to the rest position means that the sampling pulses for the data are corrected in their phase position, such that with the start of a new telegraph signal they are allotted to the center of the signals being sampled. The code counter Z ensures that the telegraph signals and continuous positions to be transmitted are arranged in proper phase relation into the predetermined clock pulse pattern of the time-division multiplex system.

Figure 1:
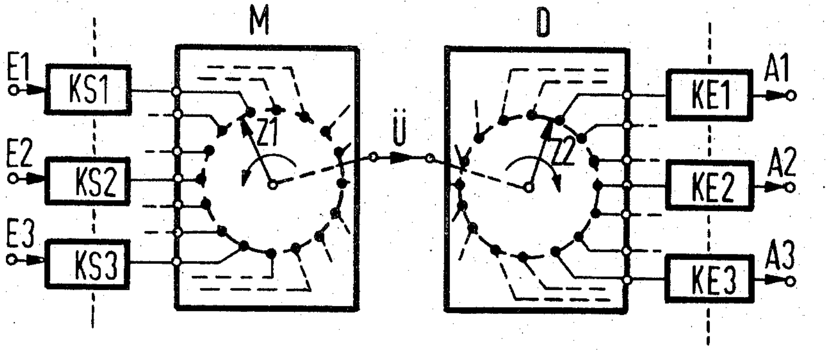
FIG. 1 is a block-schematic diagram of a prior art time division multiplex transmission system.
Figure 3:
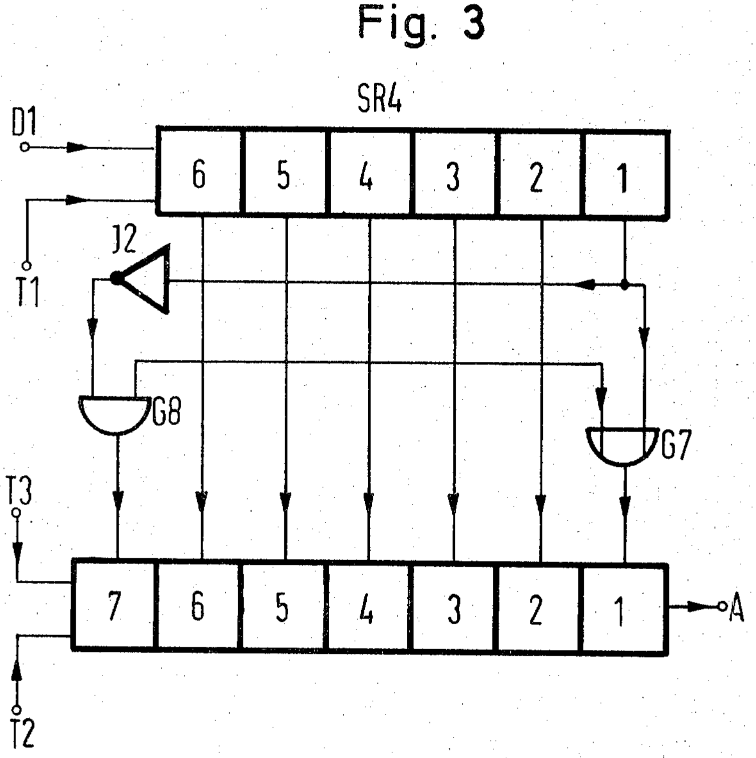
FIG. 2 is a schematic diagram of a preferred embodiment of a transmitter circuit constructed according to the invention for the character nesting of telegraph signals and continuous positions into the mulitplex signal and FIG. 3 is a schematic diagram of a preferred embodiment of a receiver circuit for the telegraph signals and continuous positions which have been transmitted in a nested manner.

FIG. 3 shows the receiver circuit which accepts the transferred data over the channel output D1 of the demultiplexer in synchronism with the system frequency, and these data are read into the shift register SR4 in synchronism with the higher frequency clock pulse T1. After termination of the read-in process the distinguishing bit for telegraph signals and steady states are contained in the stage 1 and the transferred intelligence in the stages 2 to 6. The outputs of the stages 2 to 6 are directly connected to the inputs of the stages 2 to 6 of an additional shift register SR5. After completion of the reading process into the shift register SR4, the acceptance of an information bit from the shift register SR4 to the other shift register SR5 is allowed to take place by the demultiplexer. A pulse T3 triggers the parallel acceptance, after the content of the shift register SR5 has previously been read out. The shift register SR5 has seven stages, of which the stage 1 for the start signal and the stage 7 for the stop signal are provided. If continuous positions are transferred, the state of the continuous positions is coupled to the two stages. The first two bits are evaluated in the stages 1 and 2 by means of the OR gate G7. If the first bit corresponds to the identifying code for telegraph signals, e.g. of the binary state 1, this state is input to the stage 1 of the shift register SR5. However, if at the stage 1 of the shift register SR4 the state for the transfer of the continuous positions in 0, then the bit stored in the stage 2 decides which binary state is input to the stage 1 of the shift register SR3.

The state of the stage 7 of the shift register SR5 is determined by means of the inverter J2 and the AND gate G8. If the signaling state for a telegraph signal appears in the stage 1 of the shift register SR4, then the gate G8 applies the polarity of the stop signal to the stage 7. If the signaling stage for the transmission of continuous positions appears in the stage 1 of the register SR4, the binary state stored in the stage 2 is delivered at the output of the gate G8. The shift register SR5 is read out in series by means of the clock pulse T2, which is generated in spaced relation to the telegraph reference signals, thereby generating at the output A the transmitted telegraph signals and continuous positions.

The invention has been described herein in terms of a preferred embodiment constructed according to the principles of the invention. It is contemplated that the described embodiment can be modified or changed while remaining within the spirit and scope of the invention as defined by the appended claims.

I claim:

1. Apparatus for the transmission of binary coded data signals and continuous signals from separate channels over a common channel using the time division multiplex principle wherein a fixed character frame is used, comprising:

first shift register means for receiving said data signals and continuous signals, identifying circuit means for sensing the presence of a start signal in said first shift register and for producing an output signal responsive thereto, code counter means for registering the elements of a siad data signal and including reset means which operates responsive to the presence said identifying circuit output signal, phase correction circuit means for producing clock pulses at predetermined intervals in relation to the data signals to be transmitted, second shift register means having a number of stages corresponding to the number of elements in a said data signal, means for coupling the contents of said first shift register means, in series, to said second shift register means in synchronism with said clock pulses from said phase correction circuit means, third shift register means having a number of stages corresponding to the number of information elements in a said data signal plus one additional stage, means for connecting, in parallel, the information elements from a data signal stored in said second shift register means to said third shift register means, evaluating circuit means for determining the states of the first and last stages of said second shift register for distinguishing data signals from continuous signals and for placing information in said one stage of said third shift register means indicating the outcome of said determination, means for causing the transfer of information elements of a said data signal contained in said second shift register means into said third shift register means if the first stage of said second shift register contains a start signal, said code counter means has reached its final position and said third shift register means is not being read out and means for reading out said third shift register means upon sampling of the channel associated with the data signal currently contained in said third shift register means.

2. The apparatus defined in claim 1 wherein said first shift register means comprises two flip-flop circuits, wherein said identifying circuit means comprises an exclusive OR gate and a NAND gate, said exclusive OR gate having inputs connected to each of said flip-flop circuits, the output of said exclusive OR gate being connected to an input of said NAND gate, said NAND gate, as well, having inputs connected to an output of said code counter means and an output of one of said flip-flop circuits, said NAND gate having an output connected to a reset input of said code counter means and to a reset input of said phase correction circuit means and wherein the said clock pulses produced by said phase correction circuit means are coupled to said code counter means and to said second shift register means.

3. The apparatus defined in claim 2 wherein said phase correction circuit means is a frequency divider constructed to produce clock pulses, after a period corresponding to half the nominal duration of a data signal pulse, at intervals of a nominal pulse duration of a data signal pulse.

4. The apparatus defined in claim 1 wherein said means for tranferring includes first AND gate means having inputs connected, respectively, to the first stage of said second shift register means, an output of the system multiplexer and an output of said code counter means, the output of said first AND gate being connected to said third shift register means for enabling same.

5. The apparatus defined in claim 4 wherein higher frequency clock pulses are applied to a control input of said third shift register means over a gating means if during the period for nesting of a data signal to be transmitted, a disabling signal appears at the multiplexer and wherein a polarity opposed to the start signal polarity of the data signal is applied to the data input of said third shift register means for insertion in all stages thereof during the read out of said third shift register means.

6. The apparatus defined in claim 1 further comprising:

receiver circuit means including a demultiplexer, fourth shift register means for receiving and storing data signal outputs from said demultiplexer, fifth shift register means coupled to said fourth shift register means as to receive the contents thereof in parallel, and generating means for producing start and stop signals or continuous signals and applying the signals to first and last stages of said fifth shift register means and means for reading out said fifth shift register means in synchronism with said clock pulses from said phase correction circuit means.

* * * * *